United States Patent
Auvray et al.

(10) Patent No.: US 6,572,729 B1
(45) Date of Patent: Jun. 3, 2003

(54) IMIDAZOLE DERIVATIVE-CATALYZED POLYURETHANE FORMULATIONS BASED ON HYDROXYLATED POLYBUTADIENE

(75) Inventors: Josée Auvray, Rouen (FR); Jean-Jacques Flat, Serquigny (FR); Jean-Laurent Pradel, Bernay (FR); Philippe Renouard, Brionne (FR)

(73) Assignee: Elf Atochem, Puteaux (FR)

( * ) Notice: Subject to any disclaimer, the term of this patent is extended or adjusted under 35 U.S.C. 154(b) by 0 days.

(21) Appl. No.: 09/384,233

(22) Filed: Aug. 27, 1999

(30) Foreign Application Priority Data

Aug. 27, 1998 (FR) .......................................... 98 10755

(51) Int. Cl.$^7$ .............................................. C09J 101/00
(52) U.S. Cl. ............... 156/331.4; 206/568; 252/183.11; 528/53
(58) Field of Search ..................... 252/183.11; 206/568; 156/331.4; 528/53

(56) References Cited

U.S. PATENT DOCUMENTS 3,152,094 A * 10/1964 Erner et al. ................... 528/53
3,266,625 A * 8/1966 Hardman ..................... 206/568
3,912,689 A * 10/1975 Bechara et al. ................ 528/53
4,285,854 A    8/1981 Kageyama et al.

FOREIGN PATENT DOCUMENTS

| CH | 338985   |   | 11/1989 |          |
| EP | 566247   |   | 10/1993 |          |
| EP | 672696   |   | 3/1995  |          |
| JP | 1-256511 | * | 10/1989 | ...... 528/53 |
| JP | 2-308886 | * | 12/1990 | ...... 528/53 |

* cited by examiner

*Primary Examiner*—John J. Gallagher
(74) *Attorney, Agent, or Firm*—Smith, Gambrell & Russell, LLP

(57) ABSTRACT

Polyurethane formulations based on hydroxylated polybutadiene are catalyzed by an N-substituted imidazole derivative. This type of catalysis advantageously replaces the conventional catalysts based on mercury salt. The catalysis does not pose an environmental problem and allows a particular increase in viscosity, permitting an extended pot life and rapid setting.

10 Claims, 1 Drawing Sheet

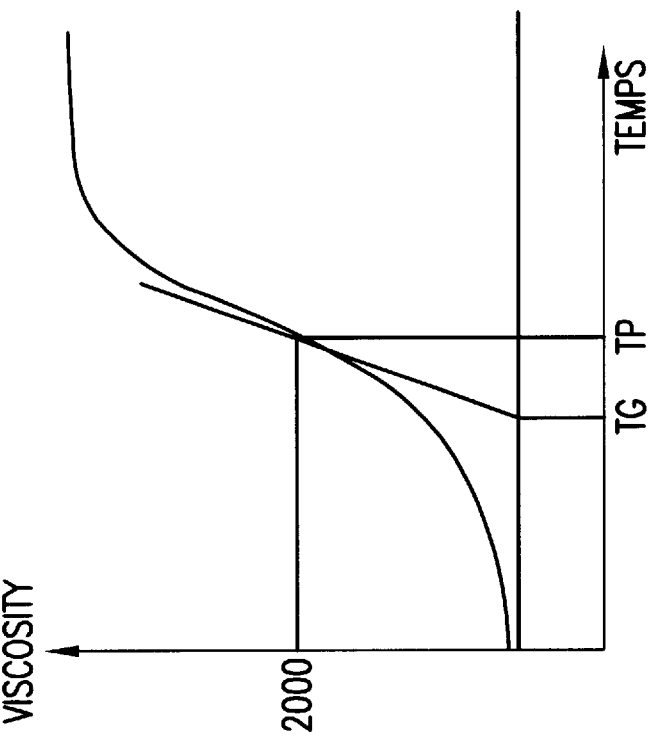

IMIDAZOLE DERIVATIVE-CATALYZED POLYURETHANE FORMULATIONS BASED ON HYDROXYLATED POLYBUTADIENE

The invention relates to the field of polyurethane formulations and, in particular, to polyurethane formulations based on hydroxylated polybutadienes, which are catalysed so as to have an extended pot life and rapid setting.

Generally speaking, the catalysis chosen for this type of formulation permits a slow increase in the viscosity of the formulation over a sufficiently long time, followed by a rapid increase. The person skilled in the art renders this, respectively, by prolonged pot life and rapid setting.

The polyurethane material is obtained by reaction between a part A comprising at least one compound having at least two alcohol functions, designated hereinafter as polyol, and a part B, comprising at least one compound having at least two isocyanate functions, designated hereinafter as polyisocyanate.

The formulations which lead to the polyurethane material therefore consist of two parts A and B which, once intimately mixed, crosslink in accordance with a particular viscosity-rise profile. Generally speaking, the catalyst system is present in part A.

Generally speaking, each part can comprise different elements, such as mineral fillers, plasticizers, stabilizers, etc.

It is found that catalysis with mercury salts, which is employed in general, meets the requirements perfectly. For example, the person skilled in the art knows that organomercury salts have a capacity to give an extended pot life and rapid setting.

However, the mercury salts pose an obvious environmental problem, and the use of these compounds is increasingly deprecated.

The problem, therefore, which the applicant is proposing to solve is to substitute the catalysts based on mercury salt by another compound which allows an extended pot life and rapid setting and which does not pose an environmental or ecotoxicological problem.

The applicant has found that an ingenious solution to this problem involves the substitution of the catalysts based on mercury salt by an at least N-substituted imidazole derivative.

Indeed, at least N-substituted imidazole derivatives contain no environmentally harmful heavy metals and, as catalysts of polyurethane formulations, allow an extended pot life and rapid setting. Furthermore, they are stable and retain their catalytic activity even in the course of prolonged storage.

The said catalyst system is used in a conventional polyurethane formulation including optionally a filler, a plasticizer and/or an adhesion promoter.

One of the subjects of the invention is a formulation which leads to a polyurethane material and consists of two parts A and B which, once intimately mixed, crosslink in accordance with a particular viscosity-rise profile, characterizing the invention as described below.

Generally speaking, the catalyst system is present in part A. However, in accordance with another variant, it may be present in part B.

In accordance with one embodiment of the invention, the part A comprising the polyol or polyols consists of:

from 5 to 99.99% by weight and, preferably, from 10 to 50% of at least one polyol, from 0 to 50% by weight and, preferably, from 10 to 50% of at least one plasticizer, from 0 to 90% by weight and, preferably, from 40 to 90% of at least one mineral filler, from 0 to 20% by weight and, preferably, from 0 to 10% of at least one dehydrating agent of the molecular sieve type, from 0 to 5% by weight and, preferably, from 0 to 1% of at least one tackifying resin, from 0 to 5% by weight and, preferably, from 0 to 1% of at least one UV stabilizer and/or one antioxidant, from 0.01 to 1% by weight and, preferably, from 0.01 to 0.1% of the catalyst system according to the invention.

The polyols which can be used are, generally, polymers having a number-average molecular mass Mn ranging from 500 to 15,000 and, preferably, ranging from 1000 to 5000.

In accordance with the invention, the polyols are preferably polydiene polyols having number-average masses of less than 7000 and, preferably, of between 1000 and 5000.

They exhibit average functionalities ranging from 1 to 5 and, preferably, of between 1.8 and 3.

In accordance with the present invention, the conjugated diene of the polydiene polyol is selected from the group consisting of butadiene, isoprene, chloroprene, 1,3-pentadiene and cyclopentadiene.

Also suitable are the copolymers of conjugated dienes and vinyl and acrylic monomers, such as styrene and acrylonitrile.

By way of illustration of polydiene polyols, mention may be made of the hydroxylated polybutadienes marketed by the company ELF ATOCHEM S.A. under the tradenames POLY BD®R-45HT and POLY BD®R-20LM.

These polyols can be used in a mixture with polyether polyols or polyester polyols.

It would not be departing from the scope of the invention to use hydroxytelechelic diene oligomers epoxidized on the chain or else hydrogenated hydroxytelechelic oligomers of conjugated dienes.

In accordance with the invention, a polyol with a mass of less than 500, referred to as chain extender, can be mixed with the polyol.

By way of illustration of such compounds, mention may be made of ethylene glycol, propylene glycol, diethylene glycol, dipropylene glycol, 1,4-butanediol, 1,6-hexanediol, 2-ethyl-1,3-hexanediol, 2-methyl-2,4-pentanediol, N,N-bis(2-hydroxypropyl)aniline and 2-methyl-1,5-pentanediol.

It would not be departing from the scope of the invention to add to the polyol a polyamine as chain extender, such as isophoronediamine. hexamethylenediamine or amine-modified ethylene glycol oligomers, such as the Jeffamine® products from the company HUNTSMAN.

The plasticizers which can be used in accordance with the present invention are plasticizers known to the person skilled in the art, namely esters of divalent or polyvalent carboxylic acids, naphthenic oils, and mixtures thereof. By way of example, preference is given to the use of dialkyl phthalates, such as di(2-ethylhexyl)phthalate and di(undecyl)phthalate, benzyl alkyl phthalates, and cycloaliphatic compounds obtained from the distillation of naphthenic cuts.

The mineral fillers, whose function is to regulate the viscosity and rheological profile of the mixture, can be selected from treated or untreated carbonates, treated or untreated silicates, treated or untreated oxides of titanium, of aluminium or of other metals, and carbon blacks.

The liquid tackifying resins which are used in order to improve the adhesion can be brought in as esters, hydrogenated or unhydrogenated terpene resins, or a mixture thereof.

The UV stabilizers and antioxidants are, generally, those used in the polyurethanes industry.

The dehydrating agent, whose function is to limit or even eliminate the harmful effect of moisture, is selected, for example, from the range of the molecular sieves.

The catalyst system will be selected from the chemical class of the substituted imidazoles, alone or in a mixture with tertiary amines in order to permit suitable ultimate crosslinking kinetics, such as triethyldiamine.

The imidazoles of the invention correspond to the following general formula:

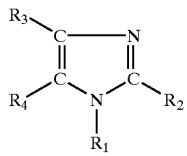

in which $R_1$ is a $C_1$–$C_4$ alkyl group such as methyl or ethyl, $R_2$, $R_3$ and $R_4$, which are identical or otherwise, are selected from the group of:
hydrogen,
$C_1$–$C_6$ cyclic or branched or linear aliphatic alkyl radicals.

According to the invention, the catalyst is chosen so as to provide an extended pot life and rapid setting. This is measured by an apparatus of the TROMBOMAT type. In particular, the slope of the curve at the point of inflection must be at least 50 Pa.s/min (see attached FIG. 1).

Part B comprising the polyisocyanate consists of
from 5 to 100% by weight and, preferably, from 20 to 40% of at least one polyisocyanate, from 0 to 80% by weight and, preferably, from 20 to 60% of at least one plasticizer, from 0 to 80% by weight and, preferably, from 5 to 40% of at least one mineral filler, which acts as pigment, from 0 to 20% by weight and, preferably, from 0 to 10% of at least one dehydrating agent of the molecular sieve type, and from 0 to 50% by weight and, preferably, from 10 to 30% of at least one adhesion promoter.

The polyisocyanates which are used in accordance with the invention are aromatic, aliphatic or cycloaliphatic polyisocyanates which carry at least two isocyanate functions.

By way of illustration, the aromatic polyisocyanates can be 4,4'-diphenylmethane diisocyanate (MDI), modified liquid MDIs, polymeric MDIs, 2,4- and 2,6-toluene diisocyanate (TDI) and a mixture thereof, xylylene diisocyanate (XDI), triphenylmethane triisocyanate, tetramethylxylylene diisocyanate (TMXDI), para-phenylene diisocyanate (PPDI), and naphthalene diisocyanate (NDI).

Among the aromatic polyisocyanates, the invention relates preferably to MDI and its polymeric derivatives.

Among the aliphatic and cycloaliphatic polyisocyanates, mention may be made of isophorone diisocyanate (IPDI) and its derivatives, 4,4'-dicyclohexylmethane diisocyanate, cyclohexyl diisocyanate, hexamethylene diisocyanate (HMDI) and its derivatives, and trimethylhexamethylene diisocyanate.

It would not be departing from the scope of the invention to use isocyanate prepolymers obtained by the reaction of an abovementioned polyisocyanate with a polyol such as, in particular, polyether polyols, polyester polyols, polydiene polyols, and polyamines.

The adhesion promoters, which are known to the person skilled in the art, are, generally, reactive or non-reactive silanes such as epoxy silanes or amino silanes.

The purpose of the additives that are added by the person skilled in the art is to facilitate the employment of the final material and/or to impart certain properties to it. The additives may be present in part A or part B or else distributed over both parts.

In order to obtain the final material, parts A and B are intimately mixed in proportions such that the ratio between the number of isocyanate functions provided by part B and the number of alcohol functions provided by part A is between 0.8 and 1.2 and, preferably, between 1 and 1.1.

In order to mix and apply the product, use will be made of a casting machine which allows the formulation to be deposited suitably as a function of the intended application.

The invention also relates to a method of adhering to substrates which comprises mixing the parts A and B, applying the mixture to at least one of the surfaces to be joined and allowing the mixture to cure between the two substrates.

Applications which are particularly suitable for the invention are the applications of adhesives and mastics such as, for example, automotive adhesives, joint mastics for double glazing, sealing membranes, or encapsulating resins.

Within the context of the invention, three parameters are defined when monitoring the increase in viscosity of the correctly apportioned mixture of part A and part B on a TROMBOMAT apparatus: (see the attached plot 1)

the gel time (TG), given by the intersection of the slope at the point of inflexion with the initial isoviscosity line;

the setting time (TP), given by the time required to reach the point of inflexion; and the slope of the viscosity-rise curve at the point of inflexion.

In order to fall within the scope of the invention, a catalyst system must allow the formulation of the two following conditions:

to have a minimum difference between gel time and setting time which is less than the gel time; and to have a slope at the point of inflexion which is high and, in particular, is greater than 50 Pa·s/min.

Within the context of the invention, it is shown that the storage stability of the novel catalyst is greater than that of the mercury-based catalyst. Indeed, following prolonged storage of the pure catalyst, its catalytic activity has not deteriorated. Furthermore, following storage of the formulated part A, the catalytic activity of the substituted imidazoles is reinforced (and reinforces the position of the product within the context of the invention), whereas the mercury-based catalyst loses its catalytic activity.

The examples which follow illustrate the invention without limiting its scope.

EXAMPLES

I. Preparation of a Part A and a Part B

The parts A and B are prepared and stored at room temperature.

I.1. Preparation of A

Part A is prepared in a tinplate can having a volume of 1 litre (height: 125 mm, diameter: 110 mm).

The mixer-disperser is a Grenier-Charvet Labotex L600 equipped with a 3-blade stirrer (diameter: 100 mm).

The part A comprises the polyol, the plasticizer and various additives and is highly charged with calcium carbonate. It is a viscous paste, off-white in colour.

Different parts A were prepared. They differ from one another only in the nature and proportion of catalyst. The preparation conditions are the same.

Tables 1 and 2 summarize, respectively, the compositions of the parts A prepared and the preparation conditions.

TABLE 1

| | | | Examples | | |
|---|---|---|---|---|---|
| Product | Tradename | Supplier | 1 % | 2 % | 3 % |
| Hydroxylated polybutadiene | Poly Bd R45HT | Elf Atochem | 18.45 | 18.45 | 18.45 |
| Tackifying resin | Novares LA 1200 | VFT | 0.78 | 0.78 | 0.78 |
| Plasticizer | Santicizer 261 | Monsanto | 15.25 | 15.25 | 15.25 |
| Titanium dioxide | R101 | Dupont | 0.97 | 0.97 | 0.97 |
| UV stabilizer | Chimassorb 81 | Ciba | 0.19 | 0.19 | 0.19 |
| Antioxidant | Irganox 1076 | Ciba | 0.39 | 0.39 | 0.39 |
| Molecular sieve | Baylith T powder | Bayer | 0.97 | 0.97 | 0.97 |
| Catalyst | | | 0.06 | 0.07 | 0.05 |
| Ground calcium carbonate | Omya BLP3 | Omya | 20.59 | 20.59 | 20.59 |
| Precipitate calcium carbonate | Calofort SM | Rhône Poulenc | 41.37 | 41.37 | 41.37 |
| Pyrogenic silica | Aerosil R202 | Degussa | 0.97 | 0.97 | 0.97 |
| TOTAL | | | 100 | 100 | 100 |

The catalysts used are as follows:
for Example 1 (comparative)
Thorcat 535, based on mercury salt, marketed by the company THOR
for Example 2 (according to the invention)
Toyocat F10, based on imidazole derivatives, marketed by the company TOSOH
for Example 3 (according to the invention)
Toyocat DM70, based on imidazole derivatives, marketed by the company TOSOH.

TABLE 2

| Mixer (brand type) | Grenier Charvet Labotex L600 | | | |
| Agitator (diameter) | Stirrer (100 mm) | | | |
| Can (diameter/height) | 1 litre can (110 mm/125 mm) | | | |

| Operation | Product | Speed (rpm) | Torque (%) | Time (min) | Temperature (° C.) |
|---|---|---|---|---|---|
| Weighing and mixing | Poly Bd R45HT Novares LA 1200 Santicizer 261 Catalyst | 500 | 16 | 2 | 20 |
| Weighing and mixing | R 101 Baylith T powder | 500 | 14 | 2 | 21 |
| Weighing and mixing | Chimassorb 81 Irganox 1076 | 500 | 14 | 2 | 22 |
| Weighing and mixing | Omya BLP3 | 500 | 23 | 5 | 24 |
| Weighing and mixing in 3 stages | Calofort SM | 300 | 78 | 15 | 42 |
| Weighing and mixing in 2 stages | Aerosil R202 | 200 | 70 | 15 | 44 |

I.2. Preparation of B

Part B is prepared in a tinplate can having a volume of 0.7 litre (height: 90 mm, diameter: 100 mm).

The mixer-disperser is a Grenier-Charvet Labotex L600 equipped with a 3-blade stirrer (diameter: 100 mm).

Part B contains principally the polyisocyanate, the carbon black, the functional silane and the plasticizer. It is a highly fluid liquid, black in colour.

A single part B was prepared for all of the examples carried out. Its composition and preparation conditions are indicated in Table 3.

TABLE 3

Composition

| Product | Commercial name | Supplier | Parts (g) | % |
|---|---|---|---|---|
| Carbon black | NC Special Schwarz 4 | Degussa | 38 | 10.86 |
| Plasticizer | Santicizer 261 | Monsanto | 144 | 41.14 |
| Molecular sieve | Baylith powder | Bayer | 20 | 5.71 |
| Adhesion promoter | Dynasylan Glymo | Hüls | 48 | 13.71 |
| Diphenylmethane diisocyanate | Desmodur VL | Bayer | 100 | 28.57 |
| TOTAL | | | 350 | 100 |

Preparation conditions

| Mixer (brand type) | Grenier Charvet Labotex L600 |
| Agitator (diameter) | 3-blade stirrer (100 mm) |
| Can (diameter/height) | 0.7 litre can (100 mm/90 mm) |

| Operation | Product | Speed (rpm) | Torque (%) | Time (min) | Temperature (° C.) |
|---|---|---|---|---|---|
| Weighing and mixing | Carbon black santicizer 261 Baylith T powder Dynasylan GLYMO | 300 | 8 | 15 | 22 |
| Weighing and mixing Storage under nitrogen | Desmodur VL | 700 | 10 | 15 | 23 |

II—Preparation of a Mastic for the Purpose of its Evaluation

The mastic is prepared by mixing part A and part B in accordance with the mixing ratio $M_A/M_B$ of 100/8 by mass. It is prepared and evaluated at the laboratory temperature: approximately 23° C.

The amount of mastic required varies for each evaluation:

approximately 300 g for the pot life
approximately 100 g for the Trombomat viscosity rise
approximately 100 g for the increase in hardness.

For a total mass of approximately 100 g, the mastic is prepared by hand.

For a total mass of approximately 300 g, the mastic is prepared using a Grenier-Charvet Labotex L600 mixer equipped with a 3-blade stirrer (diameter: 70 mm).

III—Evaluation of a Mastic

For all of the evaluations, the initial time $t_0$ is the time from which the mixing of part A and part B commences.

III.1 Pot Life

Weigh out 300 g of part A and 24 g of part B into a 600 ml polyethylene (PE) beaker. Carry out mixing using the Grenier-Charvet Labotex L600 mixer equipped with a 3-blade stirrer (diameter: 70 mm). Fill a PE mastic cartridge with the mastic just prepared. Insert the cartridge into the gun. Regulate the air pressure to 3.4 bar. At $t_0+25$ min, $t_0+30$ min and $t_0+35$ min, for example, weigh the amount of mastic delivered by the gun under 3.4 bar for 10 s. Multiply this quantity by 6 to obtain the rate in g/min. The time after which the rate is 15 g/min is the pot life.

The amount of catalyst used in this formulation corresponds to a pot life of 35 minutes.

The catalysts are therefore compared at equal pot life.

III.2 The Trombomat Viscosity Rise

Weigh out 100 g of part A and 8 g of part B into a 100 ml PE beaker. Carry out mixing with a spatula. Immediately place the beaker containing the mastic into the cell of the Trombomat. Carry out thermal conditioning to 23° C. if the room temperature is different. Plunge the ball-less rod and the temperature probe into the mastic to a depth of approximately 1 cm. Place the rod in motion (translational motion from front to back) and initiate the acquisition of the viscosity measurements over a period of 8 h. Plot the Trombomat viscosity rise curve as a function of time.

IV Results

IV.1 In the table below, the three above formulations are compared.

|  | Thorcat 535 Example 1 | Toyocat F10 Example 2 | Toyocat DM70 Example 3 |
|---|---|---|---|
| Gel time (min) | 51 | 46 | 39 |
| Setting time (min) | 73 | 79 | 71 |
| TP-TG (min) | 22 | 33 | 32 |
| Slope at 2000 Pa · s | 78 | 53 | 55 |

IV.2 In the following table, the storage stability of three catalysts is compared

| Mastic formulation | Catalyst | Pot life (min) | Gel time (min) | Setting time (min) | Slope at 2000 Pa · s |
|---|---|---|---|---|---|
| Example 1 | Thorcat 535 | 37 | 51 | 73 | 78.7 |
| (Catalyst stored for 3 months) | Thorcat 535 | 51 | 53 | 84 | 56.3 |
| FOR 128 (Part A stored for 1 month) | Thorcat 535 | 95 | 119 | 195 | 23.1 |
| Example 2 | Toyocat F10 | 35 | 46 | 79 | 53.2 |
| (Catalyst stored for 3 months) | Toyocat F10 | 31 | 44 | 78 | 52.1 |
| (Part A stored for 1 month) | Toyocat F10 | 34 | 28 | 52 | 73.0 |

IV.3 In the following table, the glass/aluminium adhesion values of different formulations are compared. The test is carried out on a sample consisting of a sheet of glass 20 mm wide covered with mastic over a thickness of 2 mm and then with a sheet of aluminium. The 90° peel breaking stress must be at least 7 N/mm.

| Formulation | Example 1 (comparative) | Example 2 (according to the invention) |
|---|---|---|
| Catalyst | Thorcat 535 | Toyocat F10 |
| Peel (N/mm) | 11 | 13 |

What is claimed is:

1. A kit for forming a polyurethane composition, comprising:

a part A, comprising:
from 5 to 99.99% by weight of at least one polyol,
from 0 to 50% by weight of at least one plasticizer,
from 0 to 90% by weight of at least one mineral filler,
from 0 to 20% by weight of at least one dehydrating agent of the molecular sieve type,
from 0 to 5% by weight of at least one tackifying resin,
from 0 to 5% by weight of at least UV stabilizer and/or one antioxidant, and
from 0.01 to 0.1% by weight of a catalyst comprising at least one N-substituted imidazole derivative having the formula:

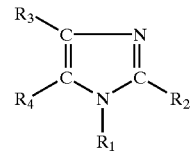

in which:
$R_1$ is a $C_1$–$C_4$ alkyl group,
$R_2$ is hydrogen, a $C_3$–$C_6$ cyclic alkyl radical, a $C_4$–$C_6$ branched aliphatic alkyl radical, or a $C_1$–$C_6$ linear aliphatic alkyl radical, and
$R_3$ and $R_4$ are $C_3$–$C_6$ cyclic or $C_4$–$C_6$ branched aliphatic alkyl radicals; and a part B, comprising:
from 5 to 100% by weight of at least one polyisocyanate,
from 0 to 80% by weight of at least one plasticizer,
from 0 to 80% by weight of at least one mineral filler, which acts as pigment,
from 0 to 20% by weight of at least one dehydrating gent of the molecular sieve type, and
from 0 to 50% by weight of at least one adhesion promoter.

2. A kit according to claim 1 comprising:
said part A comprising:
from 10 to 50% by weight of said at least one polyol,
from 10 to 50% by weight of said at least one plasticizer,
from 40 to 90% by weight of said at least one mineral filler,
from 0 to 10% by weight of said at least one dehydrating agent of the molecular sieve type,
from 0 to 1% by weight of said at least one tackifying resin,
from 0 to 1% by weight of said at least UV stabilizer and/or one antioxidant, and
from 0.01 to 0.1% by weight of said catalyst comprising at least one N-substituted imidazole derivative having the formula:

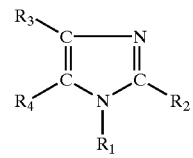

in which:
$R_1$ is a $C_1$–$C_4$ alkyl group,
$R_2$ is hydrogen, a $C_3$–$C_6$ cyclic alkyl radical, a $C_4$–$C_6$ branched aliphatic alkyl radical, or a $C_1$–$C_6$ linear aliphatic alkyl radical, and R₃ and R₄ are $C_3$–$C_6$ cyclic or $C_4$–$C_6$ branched aliphatic alkyl radicals; and said part B, comprising:
- from 20 to 40% by weight of said at least one polyisocyanate,
- from 20 to 60% by weight of said at least one plasticizer,
- from 5 to 40% by weight of said at least one mineral filler, which acts as pigment,
- from 0 to 10% by weight of said at least one dehydrating gent of the molecular sieve type, and
- from 10 to 30% by weight of said at least one adhesion promoter.

3. The kit according to claim 1, wherein the polyol is selected from polymers having a number-average mass of between 500 and 15,000 and an average functionality ranging from 1 to 5.

4. The kit according to claim 3, wherein the polyol is a hydroxylated polydiene selected from the group consisting of polybutadiene, polyisoprene, polychloroprene, poly(1,3-pentadiene) and polycyclopentadiene.

5. The kit according to claim 4, wherein the polyol is hydroxylated polybutadiene.

6. A method of joining substrates, comprising:
- mixing part A and part B according to claim 1 to form a mixture;
- applying the mixture to the substrates to be joined; and
- allowing the mixture to cure between substrates.

7. A joint mastic for insulant double glazing, comprising the kit according to claim 1.

8. A method for sealing a membrane, comprising:
- mixing part A and part B according to claim 1, to form a mixture; and
- contacting the membrane with the mixture.

9. The kit according to claim 3, wherein the number-average mass is between 1000 and 5000 and the functionality is from 1.8 to 3.

10. Automotive adhesives, joint mastics, sealing membranes, or encapsulating resins prepared by mixing parts A and B of the kit of claim 1.

* * * * *